(No Model.) 2 Sheets—Sheet 1.

J. M. WATSON.
CENTERING CHUCK.

No. 313,562. Patented Mar. 10, 1885.

Witnesses. Inventor.
Jeremiah M. Watson.
by R. H. Eddy atty.

(No Model.) 2 Sheets—Sheet 2.
J. M. WATSON.
CENTERING CHUCK.
No. 313,562. Patented Mar. 10, 1885.
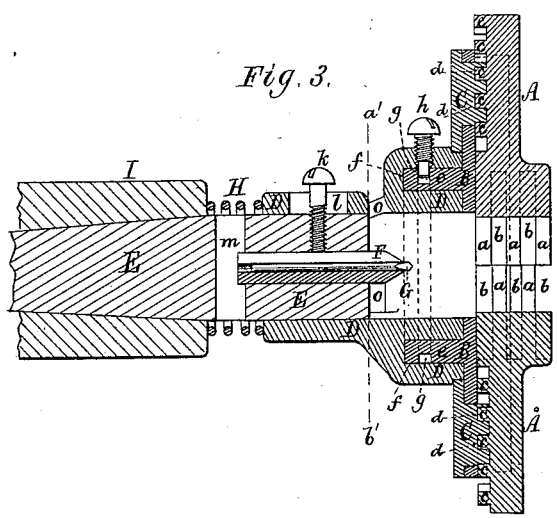
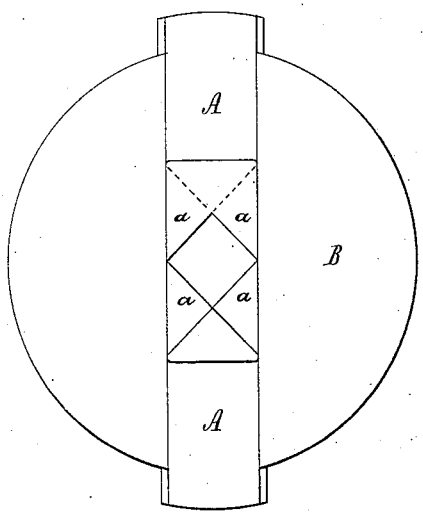
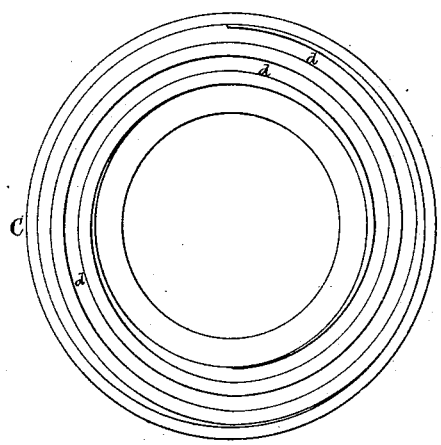
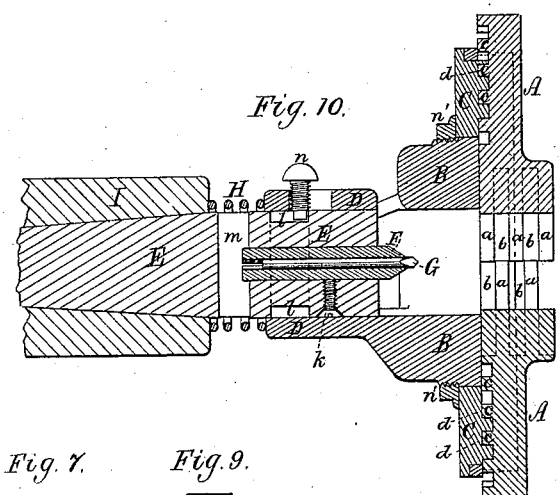
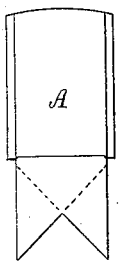
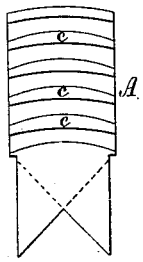
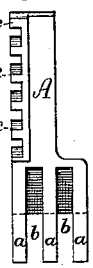
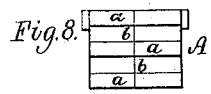
Witnesses.
S. N. Piper
Ernest B. Pratt
Inventor.
Jeremiah M. Watson
by R. H. Eddy atty.

UNITED STATES PATENT OFFICE.

JEREMIAH MEARS WATSON, OF SHARON, MASSACHUSETTS.

CENTERING-CHUCK.

SPECIFICATION forming part of Letters Patent No. 313,562, dated March 10, 1885.

Application filed October 21, 1884. (No model.)

*To all whom it may concern:*

Be it known that I, JEREMIAH MEARS WATSON, of Sharon, in the county of Norfolk, of the Commonwealth of Massachusetts, have invented a new and useful Improvement in Centering-Chucks; and I do hereby declare the same to be described in the following specification and represented in the accompanying drawings, of which—

Figure 11:
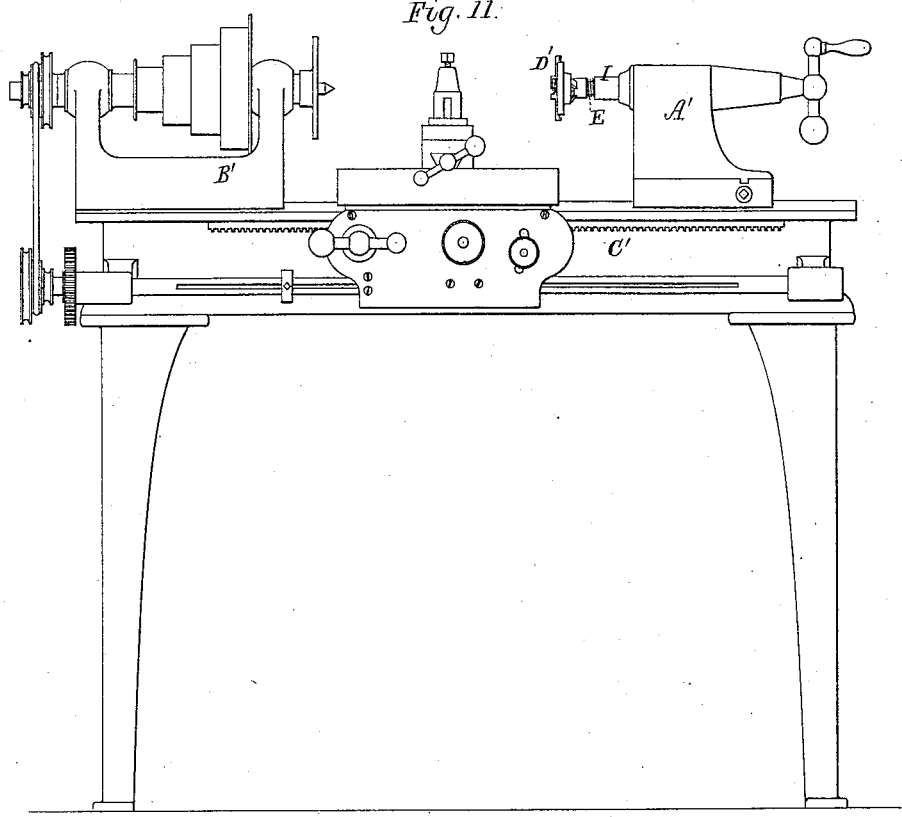
Figures 1, 5:
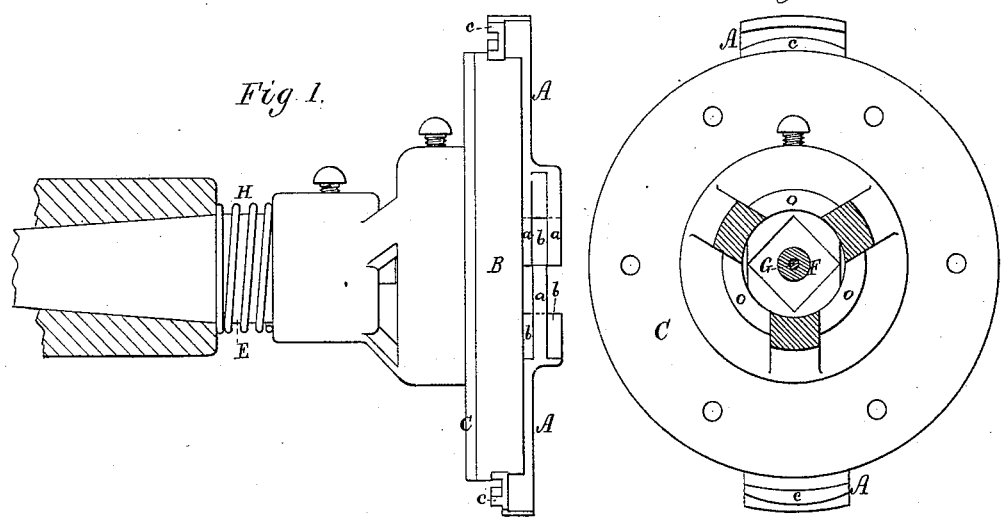

Figure 1 is a side view, Fig. 2 a front end view, and Fig. 3 a longitudinal section, of a centering-chuck containing my invention, the nature of which is defined in the claims hereinafter presented. Fig. 4 is a front view of its scroll-ring. Fig. 5 is a transverse section, it being taken on line $a'\ b'$ of Fig. 3. Fig. 6 is a front view, Fig. 7 a rear view, Fig. 8 an end view, and Fig. 9 an edge elevation, of one of the notched jaws. Fig. 10 is a longitudinal section showing some of the parts of the chuck as somewhat differently constructed and applied, as is hereinafter explained. Fig. 11 is a section of a turning-lathe with my centering-chuck applied to the tail-stock arbor thereof.

The chuck is for centering the end of a rod or article to be turned in a lathe, and it may be employed for holding to the arbor of the head-stock of a lathe a rod or article to be turned.

In the drawings, A A are a pair of jaws adapted to slide simultaneously toward or from each other within a circular head, B. Each jaw at its inner end has a series of flat teeth, $a$, in each of which there is a notch or recess, $b$, in the form of a right-angle triangle, all being as represented. Teeth of each jaw enter the spaces between those of the other, in order that when the jaws are simultaneously moved toward each other rectilinearly the square opening formed between their teeth shall be diminished in size, and shall be increased when they are simultaneously moved apart. Each jaw is dovetailed in transverse section, and enters and slides in a correspondingly-dovetailed groove in the head B diametrically thereof. Furthermore, there project from the rear side of each jaw a series of curved ribs, $c$, which enter the groove $d$ of a scroll grooved flat ring, C, concentric with the head B, and adapted to be revolved thereon.

In Fig. 3 the head B is shown as provided with a tubular journal or extension, $e$, that projects rearward from the head, and enters a correspondingly-shaped annular socket or bearing, $f$, made in a tubular shank, D. The said extension has a groove, $g$, in and around it to receive the cylindrical end part of a screw, $h$, screwed into the shank D, as shown in the said Fig. 3. The said tubular shank D can revolve on the journal of the head B, or by the screw $h$ can be clamped thereto. The shank D at its rear part encompasses another and auxiliary shank, E, provided with a countersinking-tool, F, and a center-bit, G, extending from the latter, as shown, the tool F being held in place by a set-screw, $k$, which goes through a slot, $l$, in the shank D. Surrounding the said shank E, and bearing against the rear end of the shank D, is a spiral spring, H, which, when the shank E is in the arbor I of the tail-stock of a lathe, bears against such arbor.

In Fig. 10 the head B is represented as in one piece, with its shank D adapted to encompass and slide on the shank E without an intermediate shank, D. In this latter figure the countersinking-tool is shown at F and the center-bit at G, the clamp-screw for holding the tool F in place in the shank E being shown at $k$.

The shank E, Fig. 10, has a groove, $l$, extending around it, to receive a screw, $n$, going through the shank D, the said groove being wide enough to enable the shank D to be moved backward sufficiently upon the shank E.

Extending diametrically down through the shank E, Figs. 3 and 10, is a hole, $m$, which is to enable a person, by a tool inserted in such hole, to force the tool F out of the said shank E.

In Fig. 10 the scroll grooved ring C is represented as held in place on the head B by means of a ring, $n'$, screwed on the latter.

To center a rod it is to be chucked to the arbor of a lathe, and its outer end is to be inserted between the jaws A A and up to the center tool, G, after which the scroll-ring C is to be revolved, so as to force the jaws toward each other and clamp them to the shaft, which they will properly centralize with respect to the tools F and G. On the arbor being put in revolution and the tail-stock arbor being moved toward the head-stock, the rod will be revolved and pressed against the cutting ends of the tools F and G, so as to cause them to form in it the desirable centering-cavity.

In Figs. 3 and 5, openings o in the shank D are shown in advance of the shank E, such being to enable a person to see the tools F and G, and to oil them as occasion may require.

In Fig. 3 the head B is shown as separable from its shank D; but in Fig. 10 the head B is represented as in one piece with the shank. It is sometimes convenient to have the head separable from the shank.

In Fig. 11 the arbor of the tail-stock A' of the lathe is shown at I, the head-stock, with its arbor, being represented at B', the lathe-bed at C', and the centering-chuck at D', the "center" of the arbor being removed and the shank E inserted in the arbor in the center socket thereof.

I claim—

1. The combination of the two jaws A A, having teeth notched and arranged as described, and their operative scroll-ring C, applied to them, the said jaws as set forth, with the head B and its tubular shank D, and with the spring H and the shank E, the latter extending within the shank D, and being provided with a tool or tools for countersinking, as explained, all being substantially and to operate as and for the purpose as specified.

2. The combination of a turning-lathe and a centering-chuck, substantially as described, applied to the arbor of the tail-stock of such lathe, and for use as and for the purpose specified, such chuck consisting of the two jaws A A, having teeth notched and arranged as described, the operative scroll-ring C, the head B, its tubular shank D, the spring H, and the shank E, such being applied substantially and to operate, and provided with a centering tool or tools, as set forth.

JEREMIAH MEARS WATSON.

Witnesses:
R. H. EDDY,
E. B. PRATT.